Feb. 17, 1959  W. M. SHERTS ET AL  2,873,559
FIN GRINDING MACHINE
Filed Oct. 18, 1957

INVENTORS
WILLIAM M. SHERTS
WALTER E. ZURNEY and
BY JACK TATSAK

ATTORNEY

United States Patent Office 2,873,559
Patented Feb. 17, 1959

2,873,559

FIN GRINDING MACHINE

William M. Sherts, Sewickley, Jack E. Tatsak, Templeton, and Walter E. Zurney, Kittanning, Pa., assignors to Pittsburgh Plate Glass Company, Allegheny County, Pa., a corporation of Pennsylvania Application October 18, 1957, Serial No. 690,975

1 Claim. (Cl. 51—135)

This invention relates to a grinding apparatus and more particularly to apparatus for grinding off or removing fins or projections on molded glass articles, such as lens blanks, formed by glass which has been forced between a loose fitting plunger and a plunger ring.

The primary object of this invention is the provision of an apparatus for grinding off glass fins or projections from a molded glass article.

Other objects and features of this invention will be apparent from the following description when taken with the drawing, in which.

Figure 1:
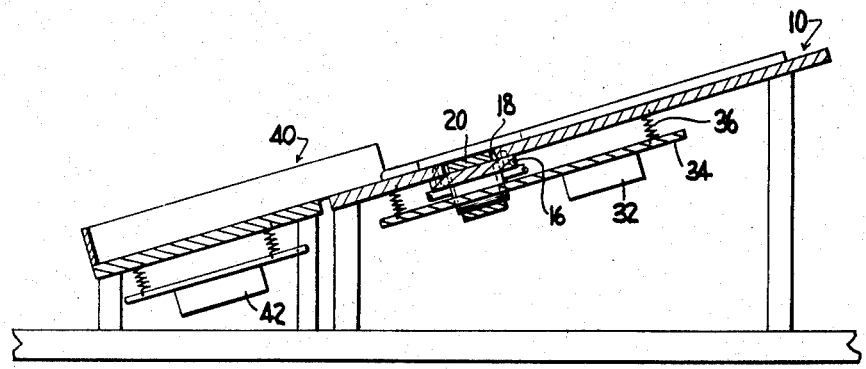
Figure 1 is a cross-sectional view of the apparatus of this invention.

In the pressing of glass articles, such as lens blanks, the plunger is provided with a convex surface to form the concave surface of the article and is received during the molding operation within a plunger ring which surrounds a mold having a desired surface configuration. During the molding operation, molten glass is forced or extruded between the plunger and the plunger ring, thereby forming a fin or projection, i. e., a relatively thin, irregularly shaped mass of glass, extending from the edge of the article adjacent its concave surface, this unwanted fin or projection being removed by grinding using the apparatus to be described.

Referring now to the drawing, the apparatus comprises an inclined table 10 composed of two parts 12 and 14 connected by means of a transverse member 16 in such a manner as to define a trough 18 to receive an endless abrasive belt 20 having a thickness substantially equal to the thickness of the table parts 12 and 14 and a width substantially equal to that of the trough. Pulleys 22 and 24 are rotatably journaled at opposite sides of the table 10, their shafts being inclined at the same angle as the table, for receiving the belt 20. One of the pulleys, such as 24, is driven by a suitable source of power, such as a motor 26.

Figure 2:
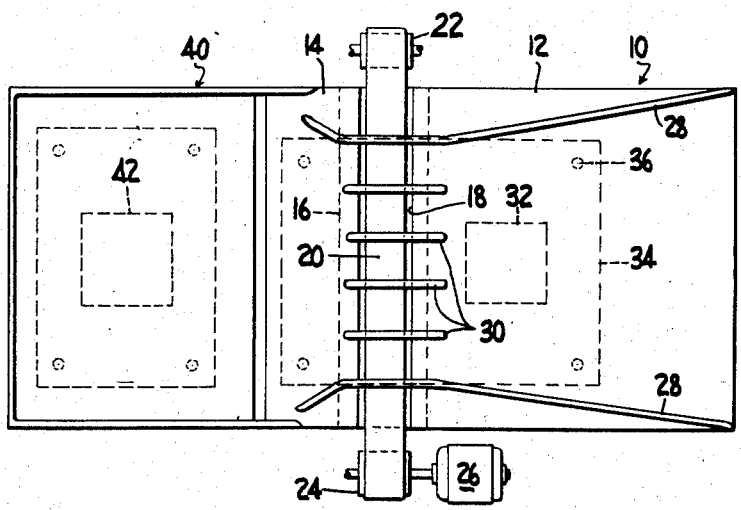
Figure 2 is a plan view of the apparatus shown in Figure 1.

Outer guide members 28 and central guide members 30 are attached to the table 10 and all of the guide members span the trough 18 and the belt 20 as illustrated. The outer guide members 28 extend from one terminal end of the table to a position adjacent the other terminal end of the table and have portions angularly arranged and the central guide members 30 are relatively short in length as illustrated in Figure 2. The guide members 28 and 30 are so spaced that a glass article easily passes between adjacent guide members.

A vibrator 32 of conventional design is provided beneath the table 10 and is supported in such a manner to impart vibration to both parts of the table. One method of supporting the vibrator is from a plate 34 connected by springs 36 to the table parts. The table 10 is supported from any horizontal surface in any conventional manner.

An inclined collecting bin 40 is disposed adjacent the lower end of the table 10 and is open at the end adjacent the table 10 to receive glass articles from the table 10. A vibrator 42 is attached to the bin 40 in a manner similar to that described with reference to the table 10. The bin 40 is also suitably supported from the horizontal surface in any conventional manner.

Molded glass articles, such as the aforementioned lens blanks, are placed by hand on the vibrating table 10 with their fins or projections facing downwardly so as to engage the surface of the table. Due to the vibration imparted to the table 10, the articles move down the incline, being guided in their downward descent and across the belt 20 by means of the spaced guide members 28 and 30. In passing over and in engagement with the belt 20, the fin or projections on the articles are ground off. The ground articles continue to move down the incline and into the collecting bin 40 to be collected therein for future use. To prevent the piling up of the ground articles at the entrance of the bin and perhaps the blocking of other articles from moving across the belt 20, the bin 40 is also vibrated.

We claim:

Apparatus for removing fins and projections on a molded glass article formed during a molding operation comprising, an inclined table for receiving such glass articles with the fins or projections in contact with its surface, means defining a transverse trough in said table, an endless flexible abrasive belt received in said trough with its upper surface substantially level with said table surface, means to move the articles across said belt with the fins or projections in contact therewith whereby the fins or projections are ground off, said means to move the articles comprising a vibrator connected to said table for imparting vibrations thereto, and means connected to said table for guiding the articles as they move across said belt.

References Cited in the file of this patent

UNITED STATES PATENTS

| | | |
|---|---|---|
| 100,503 | Chapman | Mar. 8, 1870 |
| 1,506,745 | Griffith | Sept. 2, 1924 |
| 1,633,552 | Wells | June 21, 1927 |
| 1,771,417 | Owen | July 29, 1930 |